(12) United States Patent
Zhao et al.

(10) Patent No.: US 12,403,850 B2
(45) Date of Patent: Sep. 2, 2025

(54) WIRE HARNESS MOUNTING STRUCTURE

(71) Applicant: NISSAN MOTOR CO., LTD., Yokohama (JP)

(72) Inventors: Xuyan Zhao, Kanagawa (JP); Yukinori Tsukamoto, Kanagawa (JP); Daisuke Asakura, Kanagawa (JP); Yasuya Hamada, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/833,161

(22) PCT Filed: Jan. 26, 2022

(86) PCT No.: PCT/JP2022/002897
§ 371 (c)(1),
(2) Date: Jul. 25, 2024

(87) PCT Pub. No.: WO2023/144930
PCT Pub. Date: Aug. 3, 2023

(65) Prior Publication Data
US 2025/0108769 A1  Apr. 3, 2025

(51) Int. Cl.
*B60K 1/04* (2019.01)
*B60L 15/00* (2006.01)
*B60L 50/60* (2019.01)
*B60R 16/02* (2006.01)
*H01B 7/00* (2006.01)

(52) U.S. Cl.
CPC ........ *B60R 16/0215* (2013.01); *B60L 15/007* (2013.01); *B60L 50/66* (2019.02); *B60K 1/04* (2013.01); *H01B 7/0045* (2013.01)

(58) Field of Classification Search
CPC ........ B60L 50/66; B60L 15/007; B60K 1/04; B60K 2001/0438; B60R 16/0215; H01B 7/0045
See application file for complete search history.

(56) References Cited

U.S. PATENT DOCUMENTS

2009/0294626 A1   12/2009  Abe et al.
2013/0213722 A1    8/2013  Mochizuki
(Continued)

FOREIGN PATENT DOCUMENTS

CN       103201139 A       7/2013
JP       2009-286287 A    12/2009
(Continued)

*Primary Examiner* — Jason D Shanske
*Assistant Examiner* — James J Triggs
(74) *Attorney, Agent, or Firm* — Foley & Lardner LLP

(57) ABSTRACT

A wire harness mounting structure is provided for a vehicle including a drive unit and a battery unit configured to supply electric power to the drive unit via a wire harness. The drive unit includes a drive motor configured to drive a drive wheel, and an inverter device configured to convert the electric power from the battery unit and supply the converted electric power to the drive motor. One end of the wire harness is coupled to the inverter device from a first direction in a vehicle width direction via an inverter-side connector at a side surface portion of the inverter device, and the other end of the wire harness is coupled to the battery unit from a second direction opposite to the first direction via a battery-side connector at a rear end portion of the battery unit.

5 Claims, 5 Drawing Sheets

(56) References Cited

U.S. PATENT DOCUMENTS

2017/0237379 A1 8/2017 Fukazu et al.
2022/0073016 A1 3/2022 Yamaguchi et al.

FOREIGN PATENT DOCUMENTS

| JP | 5589772 B2 | 9/2014 |
| JP | 2016-159816 A | 9/2016 |
| JP | 2017-140991 A | 8/2017 |
| JP | 2020-104558 A | 7/2020 |
| JP | 2020-189594 A | 11/2020 |
| JP | 2021-184326 A | 12/2021 |

WIRE HARNESS MOUNTING STRUCTURE

TECHNICAL FIELD

The present invention relates to a wire harness mounting structure.

BACKGROUND ART

An electric vehicle runs by converting electric power supplied from a battery into electric power suitable for driving a drive motor by an inverter device and driving the drive motor.

JP5589772B discloses an electric vehicle in which a power unit (a drive motor) and an inverter device are disposed in a motor room, and the inverter device and a main battery disposed underneath a floor of the vehicle are connected via a power cable (a wire harness) routed in a front-rear direction of the vehicle.

SUMMARY OF INVENTION

Problem to be Solved by the Invention

In recent years, a battery tends to become larger in order to extend a cruising distance of a vehicle, and a battery unit is disposed over an entire underfloor portion between front wheels and rear wheels of the vehicle. In such a configuration, since a layout space is small near the rear wheels in particular, it is necessary to devise the arrangement of a drive motor, an inverter device, and a harness. Further, in order to cope with swinging of the drive motor, it is also required to provide a margin in a harness length.

In the above patent document, a wire harness connecting a main battery to an inverter device is routed in a front-rear direction of a vehicle. However, it is difficult to form a margin space in the front-rear direction of the vehicle due to factors such as an increase in size of the battery. Therefore, there is a problem that it is not easy to provide a margin in a harness length in the front-rear direction of the vehicle, and it is difficult to cope with the swinging of the drive unit.

The present invention has been made in view of such these problems. An object of the present invention is to provide a wire harness mounting structure capable of providing a margin in a length of a wire harness particularly on a vehicle rear side which has a small space.

Means for Solving the Problem

According to an embodiment of the present invention, provided is a wire harness mounting structure for a vehicle, the vehicle including a drive unit configured to drive the vehicle and a battery unit configured to supply electric power to the drive unit via a wire harness. The battery unit is disposed on a floor between a front wheel and a rear wheel of the vehicle. The drive unit includes a drive motor disposed on a rear side of the vehicle relative to the battery unit and configured to drive a drive wheel, and an inverter device configured to convert the electric power from the battery unit and supply the converted electric power to the drive motor. The wire harness is configured such that one end is coupled to the inverter device from a vehicle width direction at a side surface portion of the inverter device, and the other end is coupled to the battery unit from the vehicle width direction at a rear end portion of the battery unit.

Effect of the Invention

According to the present invention, the wire harness is coupled to the inverter device and the battery unit in the vehicle width direction. Accordingly, even when the drive unit and the battery unit are disposed close to each other, the wire harness can be routed in a lateral direction in a gap between the drive unit and the battery unit. Further, since a harness length of the wire harness can be provided with a margin in the lateral direction, a stress of the wire harness when the drive unit swings can be relaxed.

DESCRIPTION OF EMBODIMENTS

Hereinafter, an embodiment of the present invention will be described with reference to the drawings or the like.

Figure 1:
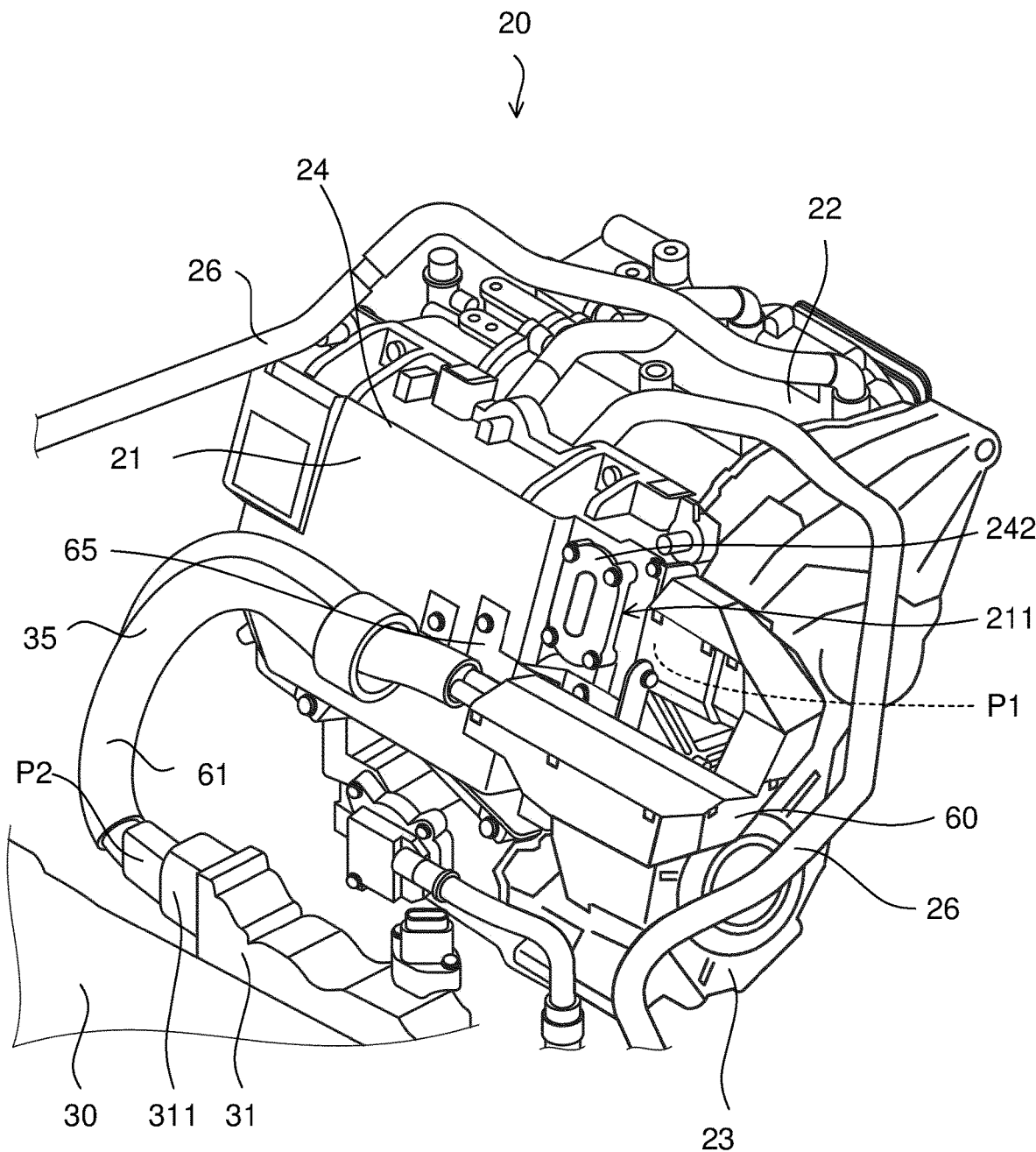
FIG. 1 is an explanatory diagram of a drive unit according to an embodiment of the present invention.
Figure 2:
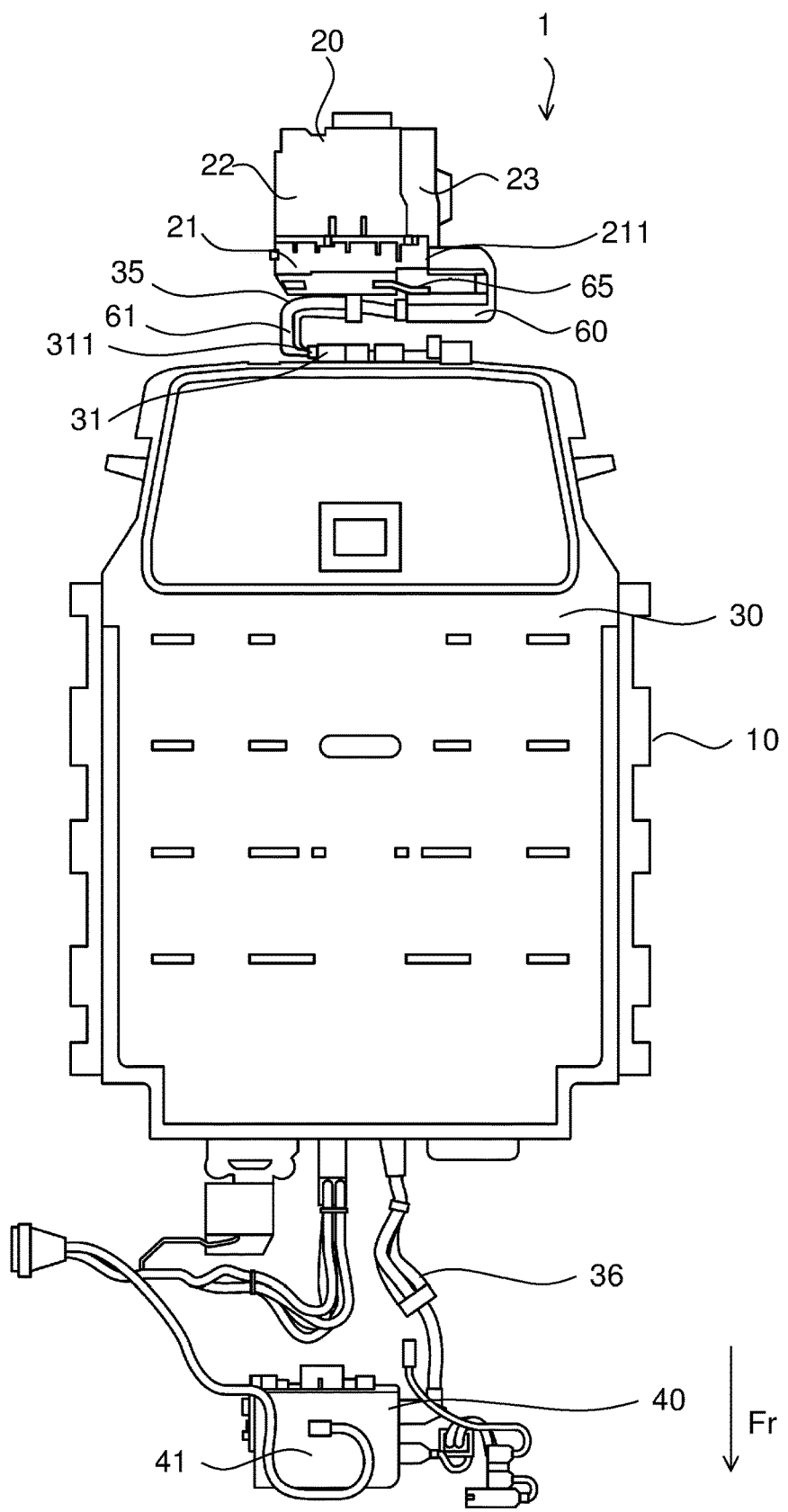
FIG. 2 is an explanatory diagram of an electric vehicle on which the drive unit is mounted.

FIG. 1 is an explanatory diagram of a rear drive unit 20 of the present embodiment. FIG. 2 is an explanatory diagram of an entire drive system of an electric vehicle 1 on which the rear drive unit 20 according to the embodiment of the present invention is mounted.

As shown in FIG. 2, the electric vehicle 1 (hereinafter, referred to as a vehicle 1) includes the rear drive unit 20, a battery unit 30, and a front drive unit 40. These units 20, 30, and 40 are mounted on a vehicle body 10 of the electric vehicle 1.

The rear drive unit 20 is disposed on the rear side of the electric vehicle 1, rather than the battery unit 30. A wire harness 35 for supplying DC power of the battery unit 30 is connected to the rear drive unit 20.

As shown in FIG. 1, the rear drive unit 20 includes an inverter device 21, a drive motor 22, and a speed reducer 23. A cooling water pipe 26 through which cooling water flows is connected to the rear drive unit 20. The rear drive unit 20 drives the vehicle 1 by driving the drive motor 22 based on the electric power from the battery unit 30 to rotate an axle 23a and a rear wheel 15 (see FIG. 5) which is a drive wheel.

In the rear drive unit 20, the drive motor 22 and the speed reducer 23 are disposed in a vehicle width direction such that rotation shafts thereof are parallel to each other. The inverter device 21 is disposed above the drive motor 22 and the speed reducer 23 so as to be inclined to a front side of the vehicle 1.

The inverter device 21 includes an inverter (not shown) that converts the electric power supplied from the battery unit 30 into electric power suitable for driving the drive motor 22 and supplies the electric power to the drive motor 22. The inverter is housed in a housing 24 that is a metal or resin case. The inverter device 21 receives electric power from the battery unit 30 and drives the drive motor 22. The inverter device 21 receives regenerative electric power from the drive motor 22 and charges the battery unit 30.

The drive motor 22 includes a rotating electric machine such as a permanent magnet embedded synchronous motor or a field winding synchronous motor.

The speed reducer 23 includes a plurality of gears that reduce a speed of rotation of the drive motor 22 and transmit the rotation to the axle. The speed reducer 23 may be configured as a transmission capable of switching a plurality of gear positions stepwise or steplessly.

As shown in FIG. 2, the battery unit 30 is disposed on a floor between a front wheel and a rear wheel of the vehicle 1. The battery unit 30 includes a plurality of battery modules therein. The wire harness 35 for supplying electric power is connected to the inverter device 21 and the battery unit 30.

The wire harness 35 includes a pair of positive and negative conducting wires obtained by applying an insulating coating to a conductor made of copper, aluminum, or the like. The wire harness 35 is covered with a protector 60 and a cushioning material 61. The wire harness 35 includes terminals connected to the inverter device 21 and the battery unit 30 at both ends thereof, is routed in the vehicle width direction between the terminals, and is routed in a curved S-shape in a top view.

As shown in FIG. 2, the front side (a motor room) of the vehicle 1 is provided with the front drive unit 40 that drives a front wheel. Similarly to the rear drive unit 20, the front drive unit 40 includes a front drive motor (not shown) and a front inverter device 41 that supplies electric power to the front drive motor. A front wire harness 36 for supplying electric power is connected between the front inverter device 41 of the front drive unit 40 and the battery unit 30.

The vehicle 1 of the present embodiment may not necessarily include the front drive unit 40. The vehicle 1 may be configured to drive only the rear wheel 15 by the rear drive unit 20.

Next, the wire harness 35 routed between the rear drive unit 20 and the battery unit 30 will be described.

When the vehicle 1 travels, the rear drive unit 20 swings relative to the battery unit 30 fixed to the vehicle body 10 due to vibration input from a road surface via a suspension or the like, vibration of the rear drive unit 20 itself, or the like. In order to prevent the wire harness connected therebetween from being deformed and damaged due to the stress caused by the swinging of the rear drive unit 20, it is desirable to provide a margin length to allow the swinging.

On the other hand, in the rear drive unit 20 disposed on the vehicle rear side, the battery unit 30 is disposed on a front side thereof, and a structure of the vehicle body 10 such as a luggage compartment is present on an upper side thereof, so that a height of the vehicle body 10 from the ground is low. Due to the structure, there is no sufficient margin in a space between the rear drive unit 20 and the battery unit 30. Further, since the wire harness is configured with thick wires so that the voltage (for example, DC 400V) of the battery unit 30 flows therethrough, the degree of freedom in bending and elasticity are low. For this reason, in the related art, there is a problem that it is difficult to provide a wire harness with a margin length.

In the present embodiment, in order to solve such a problem, the wire harness 35 is configured to have a margin length as described below.

Figure 3:
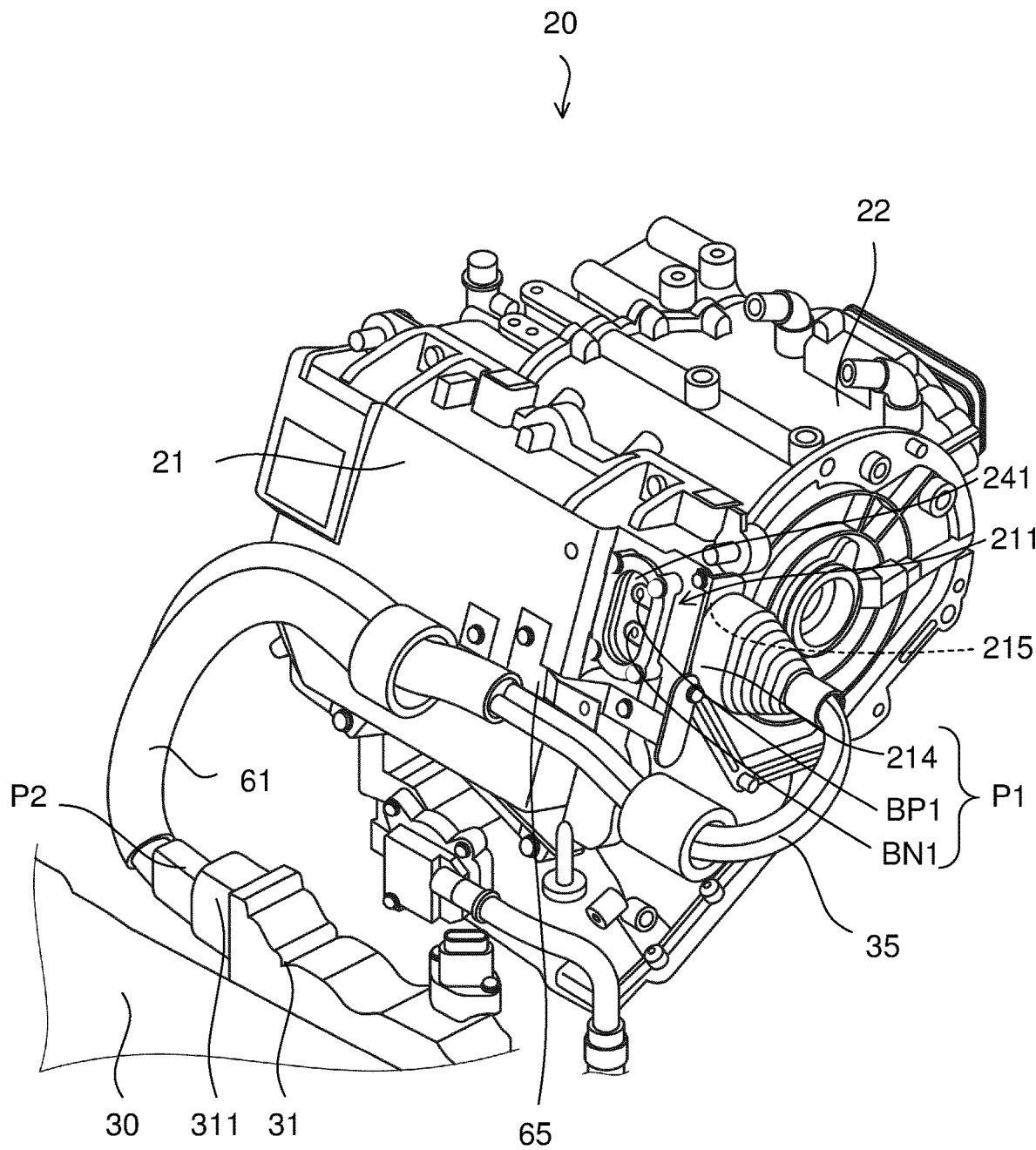
FIG. 3 is an explanatory diagram of the drive unit.

As shown in FIG. 1, the wire harness 35 is configured such that one end is connected to an inverter-side connector 211 provided on a side surface of the inverter device 21, and the other end is connected to a battery-side connector 311 provided in a connecting portion 31 arranged to protrude from a rear end side of the battery unit 30. The one end of the wire harness 35 is configured as a one-end-side connection terminal P1, and the other end thereof is configured as the other-end-side connection terminal P2. The housing 24 of the inverter device 21 includes an opening 241 to which the one-end-side connection terminal P1 described in detail with reference to FIG. 3 is fixed, and a cover 242 that closes the opening 241.

The inverter-side connector 211 is provided on a left side of the inverter device 21 in a front-rear direction of the vehicle, and is connected to the one-end-side connection terminal P1 of the wire harness 35.

The battery-side connector 311 is provided on a right side of the connecting portion 31 protruding from the rear end side of the battery unit 30 in the front-rear direction of the vehicle. The other-end-side connection terminal P2 of the wire harness 35 is connected to the battery-side connector 311.

After extending in the vehicle width direction from the inverter-side connector 211 on a left side surface of the inverter device 21, the wire harness 35 is bent by 180° toward the right side in the vehicle width direction. The wire harness 35 is routed from the left side to the right side in the vehicle width direction between the inverter device 21 and the battery unit 30, and is bent by 180° toward the left side in the vehicle width direction near a right side surface of the inverter device 21. The wire harness 35 extends to the battery-side connector 311 disposed on a right side surface of the connecting portion 31 of the battery unit 30.

As described above, the wire harness 35 is configured such that one end is coupled to the inverter-side connector 211 provided on the left side surface of the inverter device 21 from the left side to the right side (a first direction) in the vehicle width direction, and the other end is coupled to the battery-side connector 311 provided on the right side surface of the connecting portion 31 of the battery unit 30 from the right side to the left side (a second direction) in the vehicle width direction. Accordingly, the wire harness 35 is routed in the vehicle width direction and is formed in an S-shape (a Z-shape) bent at about 180° in a top view.

Also in the front inverter device 41 of the front drive unit 40, one end of the wire harness 36 is coupled to a connector provided on a left side surface of the front inverter device 41 from the left side to the right side (the second direction) in the vehicle width direction.

In addition, the wire harness 35 is covered with a U-shaped hard resin protector 60 so as to cover an outer periphery of the wire harness 35 near the inverter-side connector 211. The protector 60 is supported by an L-shaped bracket 65 formed on the housing 24 of the inverter device 21 so as to maintain a predetermined distance from the inverter device 21.

The bracket 65 includes a housing fixing portion fixed to a surface of the housing 24 by bolting, and a protector fixing portion extending toward the protector 60 and fixed to a back surface of the protector 60 by bolting. The housing fixing portion and the protector fixing portion are formed in a crank shape in the front-rear direction of the vehicle.

The wire harness 35 is covered with a cushioning material 61 made of soft resin near the battery-side connector 311.

The wire harness 35 is restricted from swinging by the protector 60 and the bracket 65 near the inverter device 21 while maintaining a predetermined distance from the inverter device 21. Accordingly, the stress caused by the vibration of the wire harness 35 more than necessary is suppressed from acting, and the durability of the wire harness 35 is improved. On the other hand, on the battery-side connector 311 side of the wire harness 35, the soft cushioning material 61 allows swinging, and suppresses the wire harness 35 from being buffered with other parts.

With such a configuration, the wire harness 35 can have a margin length in the vehicle width direction while the rear drive unit 20 is disposed close to the battery unit 30. Accordingly, since the wire harness 35 is configured to be swingable, relative swinging between the rear drive unit 20 and the vehicle body 10 to which the battery unit 30 is fixed is allowed, and the stress applied to the wire harness 35 can be relaxed.

Next, a configuration of the one-end-side connection terminal P1 of the wire harness 35 will be described.

Figure 4:
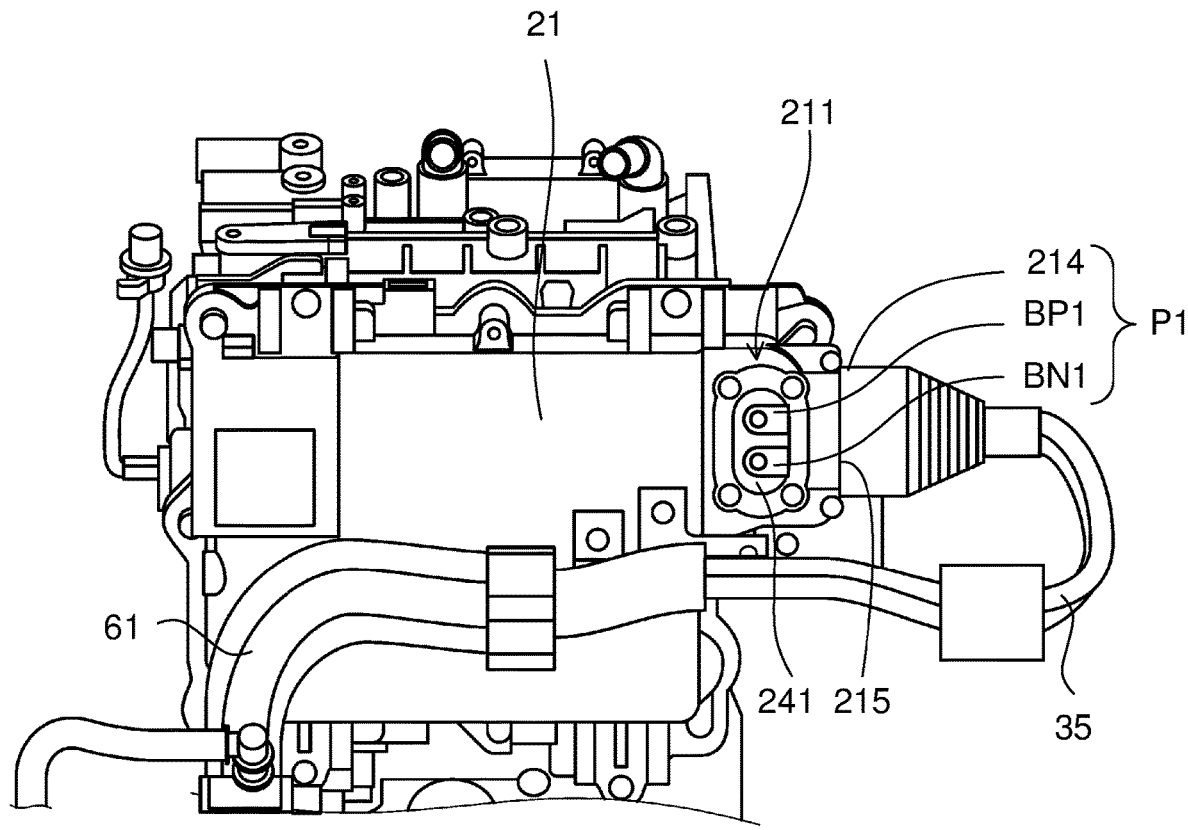
FIG. 4 is an explanatory diagram of the drive unit.

FIGS. 3 and 4 are explanatory diagrams of the inverter device 21 of the present embodiment, and are diagrams illustrating the inverter-side connector 211. FIG. 3 is a perspective view of the inverter device 21, and FIG. 4 is a front view of the inverter device 21 when viewed from the front side of the vehicle.

FIGS. 3 and 4 both show a state in which the protector 60 of the wire harness 35 and the cover 242 of the inverter-side connector 211 are removed. The speed reducer 23 is omitted.

An insertion hole 215 into which the one-end-side connection terminal P1 is inserted is formed in a side surface of the inverter device 21. On a front surface side of the inverter device 21, an opening 241 for bolting in a state in which the one-end-side connection terminal P1 is inserted is formed. A terminal (not shown) is provided inside the opening 241, and the one-end-side connection terminal P1 is fixed to the terminal.

A plate-shaped positive electrode terminal BP1 connected to a conducting wire on a positive electrode side and a plate-shaped negative electrode terminal BN1 fixed to a conducting wire on a negative electrode side are provided at a tip of the one-end-side connection terminal P1 of the wire harness 35. A bolt hole for fixing a bolt is formed in each terminal. The one-end-side connection terminal P1 of the wire harness 35 is provided with a boot 214 fixed to the insertion hole 215. As described above, in the inverter-side connector 211, the positive electrode terminal BP1 and the negative electrode terminal BN1 of the one-end-side connection terminal P1 are connected to terminals in the inverter device 21 through the opening 241.

The inverter-side connector 211 and the one-end-side connection terminal P1 configured as described above are assembled as follows. First, the positive electrode terminal BP1 and the negative electrode terminal BN1 constituting the one-end-side connection terminal P1 of the wire harness 35 are inserted from the insertion hole 215 opened in the side surface of the housing 24. The positive electrode terminal BP1 and the negative electrode terminal BN1 are fixed to the terminals on the inverter device 21 side through the opening 241 by bolting. After the positive electrode terminal BP1 and the negative electrode terminal BN1 are fixed, the opening 241 is closed by the cover 242. The boot 214 sheathing the one end of the wire harness 35 is fixed to the insertion hole 215 by bolting.

In this way, the one-end-side connection terminal P1 is fixed to the inverter-side connector 211.

As shown in FIG. 3, the other end side of the wire harness 35 includes the other-end-side connection terminal P2 which is a one-touch connector that can be inserted into and removed from the connecting portion 31 of the battery unit 30. The other-end-side connection terminal P2 is locked by being inserted into the battery-side connector 311.

With such a configuration, when the rear drive unit 20 is detached from the vehicle body 10 at the time of maintenance of the vehicle 1, firstly, an operator detaches the other-end-side connection terminal P2 from the battery-side connector 311 of the battery unit 30. The other-end-side connection terminal P2 is a one-touch connector, and thus can be easily attached and detached in a predetermined procedure. The rear drive unit 20 is detached from the vehicle body 10 in a state in which the wire harness 35 is connected thereto.

Next, a relationship between the vehicle body 10 and the rear drive unit 20 will be described.

Figure 5:
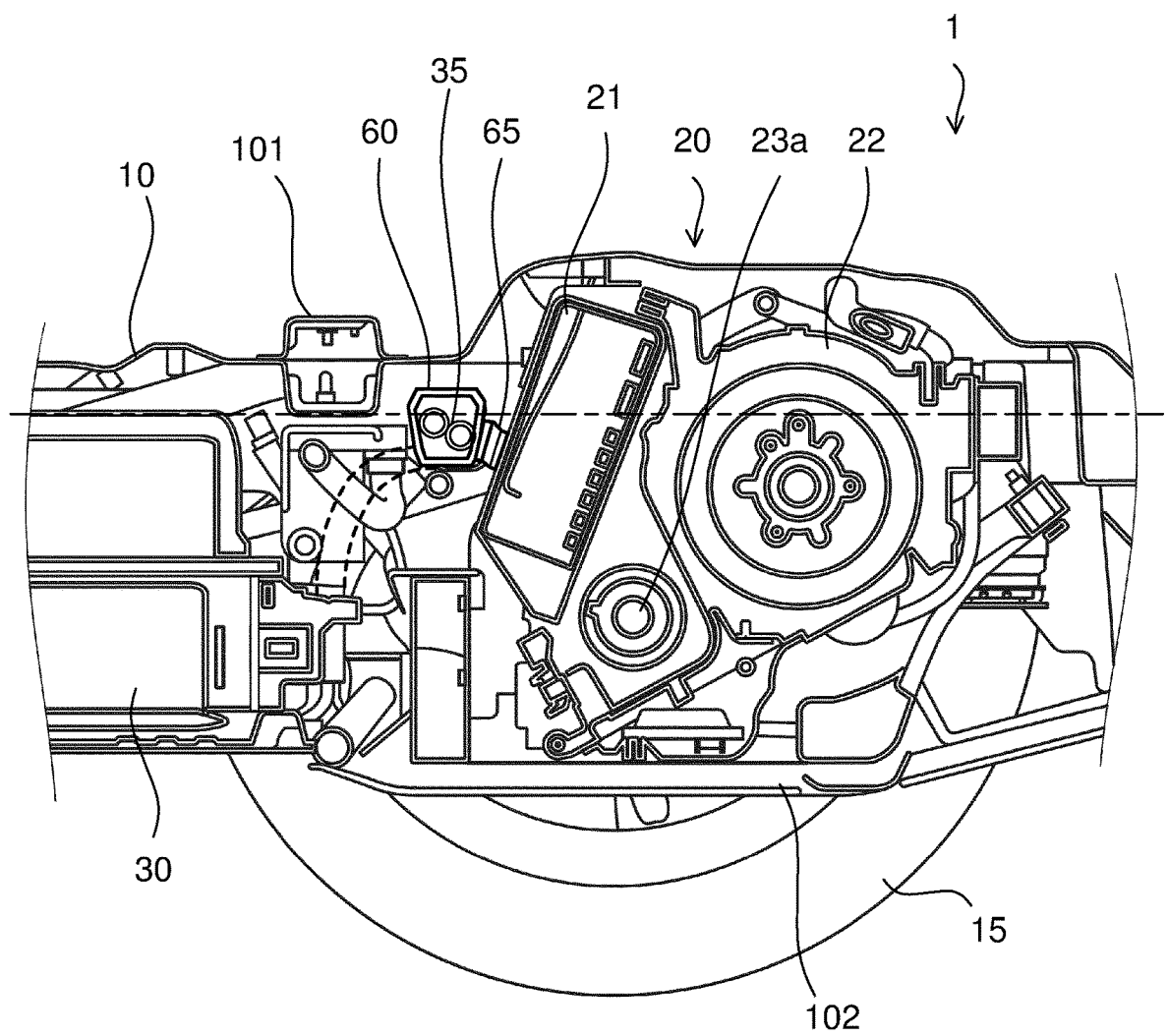
FIG. 5 is a cross-sectional view of the electric vehicle.

FIG. 5 is a longitudinal cross-sectional view of the vehicle 1 in the front-rear direction centering on the rear drive unit 20 of the present embodiment.

The rear drive unit 20 is disposed in an underfloor portion on the rear side of the vehicle body 10 via a suspension member 102 fixed to the vehicle body 10. A cross member 101 that crosses the vehicle body 10 in the width direction is disposed in the vehicle body 10. The rear drive unit 20 is disposed adjacent to the cross member 101 and behind the cross member 101. The battery unit 30 is fixed to the underfloor portion of the vehicle body 10 on a front side of the cross member 101.

The above-described wire harness 35 is routed between the rear drive unit 20 and the battery unit 30. The wire harness 35 is covered with the protector 60 near the inverter device 21. The protector 60 is fixed to an outside of the housing 24 of the inverter device 21 by the bracket 65.

Here, a case where the vehicle 1 collides is considered. In particular, in a case where the vehicle 1 collides in a traveling direction, the vehicle body 10 and the suspension member 102 are deformed near the rear drive unit 20, and the rear drive unit 20 moves toward the front side. Due to the deformation, the inverter device 21 disposed on the front side of the rear drive unit 20 may move to the cross member 101.

In this case, since the rear drive unit 20 and the cross member 101 approach each other, the wire harness 35 may be sandwiched between the housing 24 of the inverter device 21 and the cross member 101.

Therefore, in the present embodiment, a fixing position of the bracket 65 that fixes the protector 60, that is, the housing fixing portion fixed to the housing 24 and the protector fixing portion fixed to the protector 60 is lower than a height of the cross member 101 from the ground (a bottom surface of the cross member 101 indicated by a dash-dotted line in FIG. 5). As described above, by fixing the bracket 65 at a position lower than the cross member 101, a position of the wire harness 35 is restricted by the protector 60 when the vehicle 1 collides. Accordingly, since the wire harness 35 does not move upward, the wire harness 35 is suppressed from being sandwiched between the housing 24 and the cross member 101 at the time of a collision.

As described above, the vehicle 1 according to the embodiment of the present invention includes a drive unit (the rear drive unit 20) and the battery unit 30 that supplies electric power to the rear drive unit 20 via the wire harness 35. The battery unit 30 is disposed on the floor between the front wheel and the rear wheel of the vehicle 1, and the rear drive unit 20 is disposed on the rear side of the vehicle 1 rather than the battery unit 30. The rear drive unit 20 includes the drive motor 22 that drives the rear wheel 15 which is a drive wheel, and the inverter device 21 that converts the electric power from the battery unit 30 and supplies the converted electric power to the drive motor 22. The wire harness 35 is configured such that one end is coupled to the inverter device 21 from the vehicle width direction at a side surface portion of the inverter device 21, and the other end is coupled to the battery unit 30 from the vehicle width direction at a rear end portion of the battery unit 30.

With these configurations, the wire harness 35 is coupled to the inverter device 21 and the battery unit 30 in the vehicle width direction. Accordingly, even when the inverter device 21 and the battery unit 30 are disposed close to each other, the wire harness 35 can be routed in the lateral direction of the vehicle 1. Further, since a harness length of the wire harness 35 can have a margin in the lateral direction between the inverter device 21 and the battery unit 30, the stress applied to the wire harness 35 can be relaxed when the rear drive unit 20 swings.

In the present embodiment, the one end of the wire harness 35 is coupled to the inverter device 21 via the inverter-side connector 211 from the left side to the right side (the first direction) in the vehicle width direction, and the other end thereof is coupled to the battery unit 30 via the battery-side connector 311 from the right side to the left side (the second direction) in the vehicle width direction, which is opposite to the first direction.

With these configurations, since the wire harness 35 is bent and routed in an S-shape between the first direction and the second direction, the wire harness 35 can be routed in the lateral direction in the gap between the inverter device 21 and the battery unit 30, and the harness length of the wire harness 35 can be provided with a margin.

In the present embodiment, the inverter-side connector 211 fixes the wire harness 35 to the inverter device 21 by bolting, and the battery-side connector 311 includes a detachable one-touch connector.

With these configurations, the rear drive unit 20 can be detached from the vehicle body 10 together with the wire harness 35 by detaching the battery-side connector 311 that can be easily attached and detached at the time of maintenance or the like.

In the present embodiment, a front side of the vehicle 1 is provided with the front drive unit 40 including the front inverter device 41 and the front wire harness 36 that supplies the electric power from the battery unit 30 to the front inverter device 41. The front wire harness 36 is configured such that one end is coupled to the battery unit 30, and the other end is coupled to the front inverter device 41 from the left side to the right side (the first direction) in the vehicle width direction.

In this way, since the inverter device 21 disposed on a rear wheel side and the front inverter device 41 disposed on a front wheel side are connected to the wire harnesses 35 and 36 from the same first direction, the inverter device 21 disposed on the rear side and the front inverter device 41 can have the same connector and internal configuration. Accordingly, there is no need to use different parts for the inverter device 21 and the front inverter device 41, and manufacturing costs can be suppressed.

In the present embodiment, the wire harness 35 is covered with the protector 60 to restrict swinging near the one end, that is, near the inverter-side connector 211 of the inverter device 21.

With this configuration, the wire harness 35 is restricted from swinging more than necessary near the inverter-side connector 211 of the inverter device 21, and the durability of the wire harness 35 can be improved. On the battery-side connector 311 side of the wire harness 35, the soft cushioning material 61 allows swinging, and suppresses the wire harness 35 from being buffered with other parts.

In the present embodiment, the rear drive unit 20 is provided adjacent to the cross member 101 that crosses underneath the floor of the vehicle 1 in the vehicle width direction and behind the cross member 101, the protector 60 is fixed to the housing 24 of the inverter device 21 by the bracket 65, and a fixing position between the bracket 65 and the housing 24 is located between the cross member 101 and the inverter device 21 and below the cross member 101.

With these configurations, in a case where the inverter device 21 and the cross member 101 approach each other due to deformation of the vehicle body 10 at the time of a vehicle collision, the wire harness 35 can be prevented from being sandwiched between the inverter device 21 and the cross member 101 by the fixing position of the protector 60 and the bracket 65.

Although the embodiment and modifications of the present invention (the wire harness attaching (connecting) structure) have been described above, the above embodiment and modifications are merely a part of application examples of the present invention, and do not mean that the technical scope of the present invention is limited to the specific configurations of the above embodiment.

The invention claimed is:

1. A system comprising:
a wire harness;
a drive unit configured to drive a vehicle; and
a battery unit configured to supply electric power to the drive unit, wherein the battery unit is located on a front side of the drive unit, wherein:
the drive unit comprises a drive motor configured to drive a drive wheel, and an inverter device located on a front side of the drive motor and configured to convert the electric power from the battery unit and supply the converted electric power to the drive motor, and
the wire harness is formed in a continuous S-shape and configured such that one end of the wire harness is coupled to the inverter device from a first direction in a vehicle width direction via an inverter-side connector at a side surface portion of the inverter device, and the other end of the wire harness is coupled to the battery unit from a second direction opposite to the first direction via a battery-side connector at a rear end portion of the battery unit.

2. The system according to claim 1, wherein:
the inverter-side connector is configured to fix the wire harness to the inverter device by bolting, and
the battery-side connector comprises a detachable one-touch connector.

3. The system according to claim 2, wherein:
a front side of the vehicle comprises a front drive unit comprising a front inverter device, and a front wire harness configured to supply the electric power from the battery unit to the front inverter device, and wherein:
the front wire harness is configured such that one end of the front wire harness is coupled to the battery unit, and the other end of the front wire harness is coupled to the front inverter device from the first direction.

4. The system according to any claim 1, further comprising:
a protector that covers an end portion the wire harness, the protector configured to restrict swinging of the wire harness.

5. A vehicle comprising:
a cross member that crosses underneath a floor of the vehicle in a vehicle width direction; and
the system according to claim 4, wherein:
the drive unit is located adjacent to and behind the cross member,
the protector is fixed to a housing of the inverter device by a bracket, and
a fixing position between the bracket and the housing is located between the cross member and the inverter device and below the cross member.

* * * * *